United States Patent [19]
Johnson

[11] Patent Number: 5,098,168
[45] Date of Patent: Mar. 24, 1992

[54] HUB AND SPINDLE ASSEMBLY

[76] Inventor: Lawrence N. Johnson, 130 W. High Dr., Spokane, Wash. 99203

[21] Appl. No.: 590,792

[22] Filed: Oct. 1, 1990

[51] Int. Cl.⁵ .................................................. B60B 35/02
[52] U.S. Cl. ............................. 301/124 R; 301/105 R; 301/108 R; 280/414.1
[58] Field of Search ........... 301/105 R, 108 R, 108 A, 301/108 S, 108 TW, 108 SC, 111, 124 R, 126, 131; 305/11; 280/414.1

[56] References Cited

U.S. PATENT DOCUMENTS

| | | |
|---|---|---|
| 3,077,948 | 2/1963 | Law . |
| 3,089,738 | 5/1963 | Steiner . |
| 3,226,162 | 12/1965 | Eberle ........................... 301/108 R |
| 3,330,563 | 7/1967 | DePuydt et al. . |
| 3,642,327 | 2/1972 | Walther ......................... 301/108 R |
| 3,955,642 | 5/1976 | Luebkemann .................. 184/12 |
| 4,106,816 | 8/1978 | August ........................... 301/108 R |
| 4,113,061 | 9/1978 | Peaster ........................... 184/41 |
| 4,190,133 | 2/1980 | Ploeger ........................... 284/1 D |
| 4,489,988 | 12/1984 | Robbins ......................... 301/108 S |
| 4,557,526 | 12/1985 | Smith ............................. 301/124 R |

FOREIGN PATENT DOCUMENTS 506867  10/1954  Canada ........................... 301/108 S Primary Examiner—Russell D. Stormer
Attorney, Agent, or Firm—Wall and Roehrig

[57] ABSTRACT

A waterproof hub and spindle assembly for boat trailers is provided with an oil lubricating chamber that is connected to an air chamber open on the bottom and adapted to trap air therein as the hub and spindle assembly is submerged. The air in the chamber is compressed as submersion increases which pressurizes the lubricating chamber to prevent contaminants from entering into the bearing structure.

18 Claims, 2 Drawing Sheets

HUB AND SPINDLE ASSEMBLY

BACKGROUND OF THE INVENTION

This invention relates to an oil-bath wheel spindle and hub assembly that is especially suitable for use on boat trailers. Specifically, the invention relates to an improved oil-bath wheel spindle and hub assembly which pressurizes the inside of the hub when the assembly is submerged in water during launching or loading the boat.

Generally, wheel spindle and hub assemblies are of two types utilizing either grease or oil as the lubricating medium. An oil-bath hub and spindle is normally comprised of a spindle, two or more bearings for rotatably supporting a hub, a hub, and an oil seal on both the inboard and outboard end of the hub. A lubricant receiving cavity is formed by the spindle, the hub, and the inner and outer seals.

In oil-bath spindles, the lubricant receiving cavity is filled with oil to a level sufficient to lubricate the spindle/hub assembly. In operation, a sufficient quantity of oil must remain in this cavity at all times. Because preventing oil loss is an important concern in an oil-bath hub and spindle assembly, the lubricant receiving cavity must be sealed at all times. Accordingly, the seals in an oil-bath spindle assembly must maintain a near airtight seal to prevent oil leakage.

Wheel spindles used on boat trailers are unique in that they are periodically intentionally submerged in water. To avoid corrosion, however, water must be prevented from entering into the hub and spindle assembly. The seals of the hub and spindle assembly must keep the lubricant in, and water and foreign particles out of the lubricant chamber.

The operation of a boat trailer over the road causes the hub and spindle assembly to become hot. As a result, the air in the lubricant receiving cavity expands as the spindle assembly becomes heated. This heating increases the pressure of air in the cavity, and in prior art devices can cause hot air to bleed through the seals. When the boat trailer is then backed into cold water to launch a boat, the spindle assembly is rapidly cooled. This rapid cooling then creates a reduced pressure inside the lubricant receiving cavity in both the ordinary grease filled hub and oil lubricated hub. As a result, water and foreign particles may be drawn through the oil seals and into the lubricant receiving cavity. Any water and foreign particles entering the lubricant receiving cavity shortens the spindle assembly's life span by causing rust and abrasion inside the spindle assembly.

Once the seals lose air tight integrity, oil or grease leakage is likely to result and the leaking seal must be replaced in the ordinary hubs. Failure by the operator to recognize this oil leakage, can result in a sufficient loss of oil or grease from the lubricant receiving cavity to increase friction causing subsequent failure of the spindle assembly.

Efforts have been made to eliminate the problems associated with immersing a hot spindle assembly in cold water, by the use of inflatable seals, venting tubes and air compressors. Examples of these efforts are found in U.S. Pat. Nos. 3,330,563; 4,557,526 and 4,489,998. These efforts have created some additional difficulties of their own.

Spindle assemblies utilizing inflatable seals such as disclosed in U.S. Pat. No. 3,330,563, or air compressors such as disclosed in U.S. Pat. No. 4,489,988, are pressurized from an external source. This adds to both the initial costs and the maintenance costs of a boat trailer using either system.

In systems employing inflatable seals, pressurized air comes from either a tank or air compressor. Pressurized air tanks must be periodically recharged or replaced and these systems must be manually actuated on and off by the boater or the seal will fail. As the pressurized air in a tank runs out, the effectiveness of the inflatable seal system decreases. Failure by the trailer operator to replace or recharge an expended tank results in such an inflatable seal system becoming ineffective. In addition, hub and spindle assemblies utilizing air compressors or inflatable seals employing air compressors require periodic maintenance to keep functioning properly. In many cases, the trailer owner will lack the knowledge necessary to maintain the system. This will further add to the cost of the system, as the owner will be required to pay someone else to maintain the system or allow the system will become inoperative.

Spindle assemblies utilizing a venting tube system such as disclosed in U.S. Pat. No. 4,557,526, contain one or more venting tubes that to function properly must extend upwardly to a height above the depth of the water in which the trailer is submerged. As a result, the trailer owner or manufacturer must anticipate the maximum depth to which the trailer will ever be submerged. As a consequence, the venting tubes tend to be very long, which exposes the tube to being bent, cut, crimped and otherwise damaged. If the seal fails, the chamber will have water drawn inside due to the unrestricted air flow through the venting tube.

Another manner of lubricating a spindle assembly is to use grease instead of an oil-bath. One such system is disclosed in Everett, U.S. Pat. No. 4,262,978, wherein there is described a grease spindle assembly in which the lubricant cavity includes a passageway which vents the lubricating medium. Grease is injected into the spindle assembly at the outboard end, until it completely fills the lubricating cavity. As more grease is injected, the grease pushes through the cavity, and from there flows through the spindle assembly until it exits from the spindle through the vent passageway. The passageway allows the grease to push any air trapped in the lubricant cavity through the passageway to the atmosphere.

As the grease-filled bearing assembly is used, grease must be regularly added and it will be continually moved through the assembly out the passageway to the atmosphere. If grease is constantly forced through the bearing assembly, a grease dam at the end of the passageway will close any opening to the atmosphere. This grease dam, if maintained, will prevent water and silt from entering the bearing assembly when the grease-filled wheel spindle is submerged in water. The grease spindle assembly can continually drip grease, however, which causes damage to both pavement and the environment, and unless constantly maintained the water seal is lost.

With a grease-filled bearing assembly the amount of air present in the lubricant cavity is minimized. If the lubricant cavity is totally filled with grease, there is little or no pressure change when a hot spindle assembly is immersed in cold water. Therefore, a grease-filled, grease-receiving cavity protects the spindle seals by minimizing pressure changes in the cavity. Because of the higher viscosity of grease relative to oil, however, the bearing pre-load adjustment must be lower than that for oil. As is known to those skilled in the art, lower bearing pre-load leads to shortened bearing and seal life.

With the oil-filled hub and spindle assembly of the present invention, these limitations of a grease-filled spindle assembly are overcome. In addition to allowing higher bearing preload, the oil-filled hub and spindle assembly has a much longer maintenance free life. A once a year check to "top off" the oil in the hub-spindle chamber is all that is required to insure against entry of water and dirt, and to prevent the destruction of the bearing. In this manner, the oil-filled hub and spindle of the present invention needs extremely little maintenance.

OBJECTS AND SUMMARY OF THE INVENTION

It is, therefore, an object of the present invention to improve oil-bath hub and spindle assemblies.

It is another object of the invention to improve oil-bath spindle assemblies for use on boat trailers by equalizing the pressure within the lubricant receiving cavity when a boat trailer is run on the road and then submerged in cold water.

A further object of the present invention is to protect the integrity of the oil seals of the spindle assembly by equalizing the pressure on each side of the lubricant cavity seals when the boat trailer is submerged in water.

Another object of the present invention is to prevent the entry of water and foreign objects into the spindle assembly to prolong bearing, hub, and spindle life.

Still another object of the present invention is to equalize pressure within an oil-bath spindle assembly to prevent oil leakage.

These and other objects of the present invention are attained by means of an oil-bath hub and spindle assembly wherein the lubricant receiving cavity is connected by an air flow line to an air chamber, such that when the spindle assembly is submerged in water the pressure within the lubricant receiving cavity is equalized, with the pressure on the outside of the cavity seal, thereby preventing water and foreign objects from entering the lubricant receiving cavity through the spindle seals. The oil contained within the lubricant receiving cavity functions as an oil-bath air filter. When the wheel is turning, due to centrifugal action the oil coats the hub interior allowing air pressure to equalize. When the trailer is sitting in the hot sun, any air pressure build-up is dissipated by air bubbles passing out from the cavity through the oil which fills the lower half of the cavity. After running, when the hub is cooled, air is drawn into the cavity through the oil which acts as an oil-bath air filter.

BRIEF DESCRIPTION OF THE DRAWINGS

For a better understanding of these and other objects of the present invention, reference will be made to the following detailed description of the invention which is to be read in conjunction with the accompanying drawings, wherein.

DESCRIPTION OF THE PREFERRED EMBODIMENT

Figure 1:
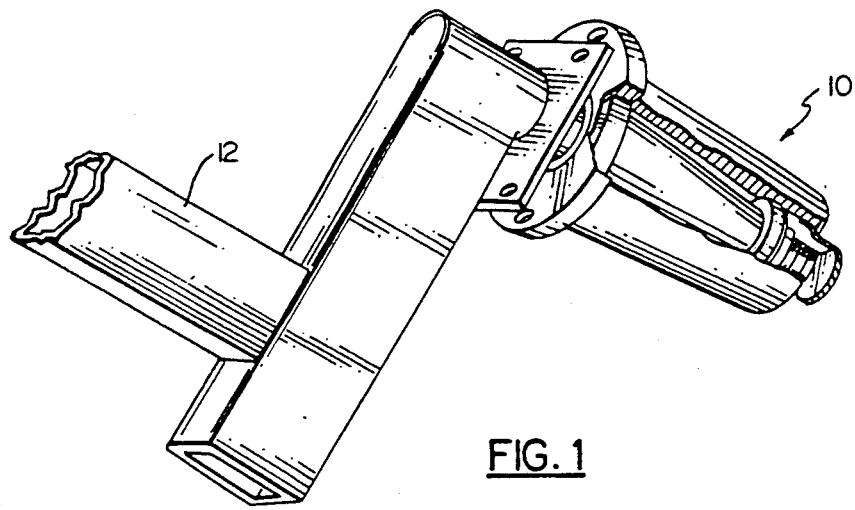
FIG. 1 is a perspective view of a wheel spindle assembly secured to a drop axle and having portions cut away to better illustrate the internal structure thereof.

Referring to FIG. 1, there is shown a portion of a spindle and hub used on a boat trailer for transporting boats over roads to water. As is known, boat trailers utilize two or more hub and spindle assemblies 10 for rotatably mounting two or more trailer wheels. Wheel hub and spindle assemblies 10 are connected by an axle which may take the form of a drop axle 12 within the trailer frame, not shown. The drop axle design allows a boat to be more readily placed onto the trailer and to be carried lower on the trailer during transportation but the present invention is equally applicable to a conventional axle.

Figure 2:
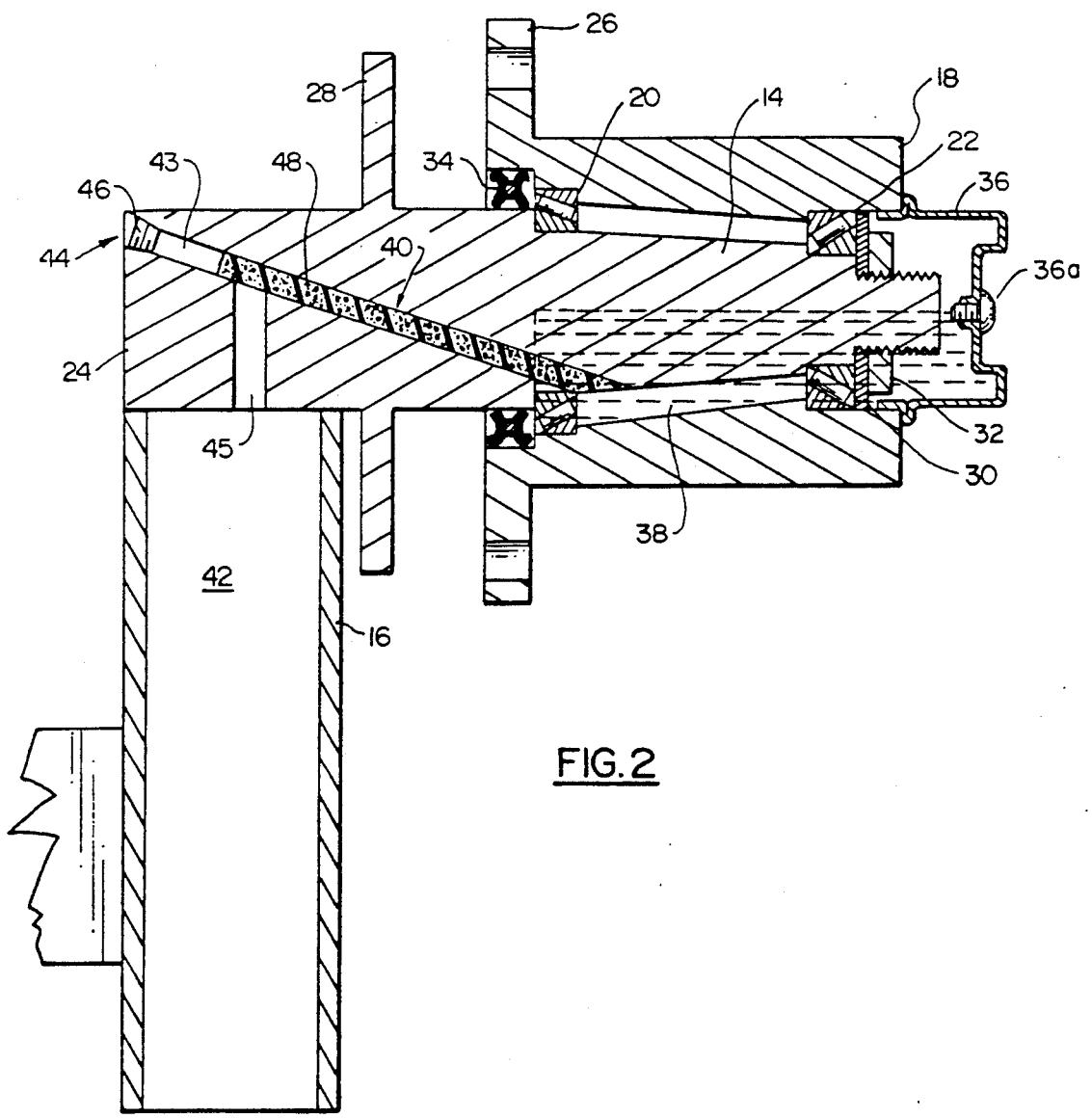
FIG. 2 is a side elevation with portions cut away of an oil-bath wheel spindle assembly embodying the teachings of the present invention.

Referring now to FIG. 2, there is shown a side view of an embodiment of an oil-bath hub and spindle assembly 10 with portions cut away to better reveal the internal structure. Wheel spindle assembly 10 is generally comprised of a spindle 14, welded or otherwise secured to fully seal the top of tube 16, which in turn is welded to axle 12 on the inboard side near the other end for a drop-axle configuration or on the spindle axis for a conventional axle type trailer. Hub 18 is mounted on spindle 14 on inboard and outboard bearings 20 and 22, respectively. Hollow tube 16 is closed by the inboard end 24 of spindle 14, and is open at the bottom forming an air pressure chamber 42. A brake unit (not shown) is secured to a backplate 28 at the inboard end of the spindle. The outboard end of spindle 14 has a plurality of steps forming shoulders for receiving outer bearing 22. An innermost step forms a shoulder against which inner bearing 20 is positioned. Hub 18 is held in position on the inner bearing and outer bearings by the washer 30 and a nut 32 as is customary in the art.

The interior of hub 18 is sealed at the inboard end by a circular oil seal 34 and sealed at the outboard end by a pressure fit oil seal cap 36 to form a lubricant cavity 38. The oil seal 34 and oil seal cap 36 keep oil used to lubricate spindle assembly 10 within lubricant cavity 38 and foreign particles and moisture out of the lubricant cavity. Cavity 38 is filled approximately half-full as shown and will be described in detail herein.

An air passage 40 is formed in the spindle 14 to communicate with air pressure chamber 42. Air within the lubricant cavity 38 warmed by the spindle assembly's operation on land is able to freely escape to the atmosphere through the air passage 40 and chamber 42. In this embodiment, air passageway 40 is created by drilling two bores into spindle 14. A first bore 43 is drilled from the upper portion of the inboard end of spindle 14 at a predetermined downward angle until it intersects with the lower edge of spindle 14 adjacent the inner bearing 20. Preferably, the hole 50 is partially covered by bearing 20 to restrict air flow. The level of oil in lubricant cavity 38 is such that it is sufficient to cover the opening 50. A second bore 45 is drilled at a determined angle from a predetermined position within pressure chamber 42 until it intersects second bore 43.

A suitable plug 46 closes the opening in the inboard end of the spindle and an oil-impregnated filter 48 may be placed in the passageway 40, if desired. The oil impregnated filter 48 is inserted into bore 43, effectively sealing moisture from the atmosphere out of lubricant cavity 38.

Air pressure chamber 42 is formed by the hollow interior of tube 16 that is closed except for the opening to the atmosphere at its lower end. The axle 12 at the inboard side of the lower end of the air pressure chamber extends to a second spindle assembly 10 on the other side of the trailer to support the frame on wheels in the usual fashion.

When spindle assembly 10 is submerged in water to launch a boat, air is trapped by the water in air chamber 42. The trapped air is compressed as spindle assembly 10 is submerged deeper into the water. The compression of the air within chamber 42 creates a positive pressure which is communicated through air passageway 40 to lubricant cavity 38, and thereby equalizes the pressure inside lubricant cavity 38 with the external water pressure as spindle assembly 10 is submerged. The quantity of air trapped in the pressure chamber 42 is sufficient to prevent water from entering the air passageway 40 and creates a pressure somewhat greater than the ambient pressure on the assembly and definitely greater than the reduced pressure caused by cool water which is sufficient to prevent water from entering the cavity 38 through either seal. Equalizing the pressure within lubricant cavity 38 with the external water pressure prevents reduced pressure from existing within lubricant cavity 38 due to the sudden cooling of the heated air and lubricant. In this manner, water and foreign particles are prevented from being drawn through the oil seals into the lubricant cavity. By preventing water and foreign particles from entering lubricant cavity 38, the spindle assembly's life span is significantly increased.

Figure 3:
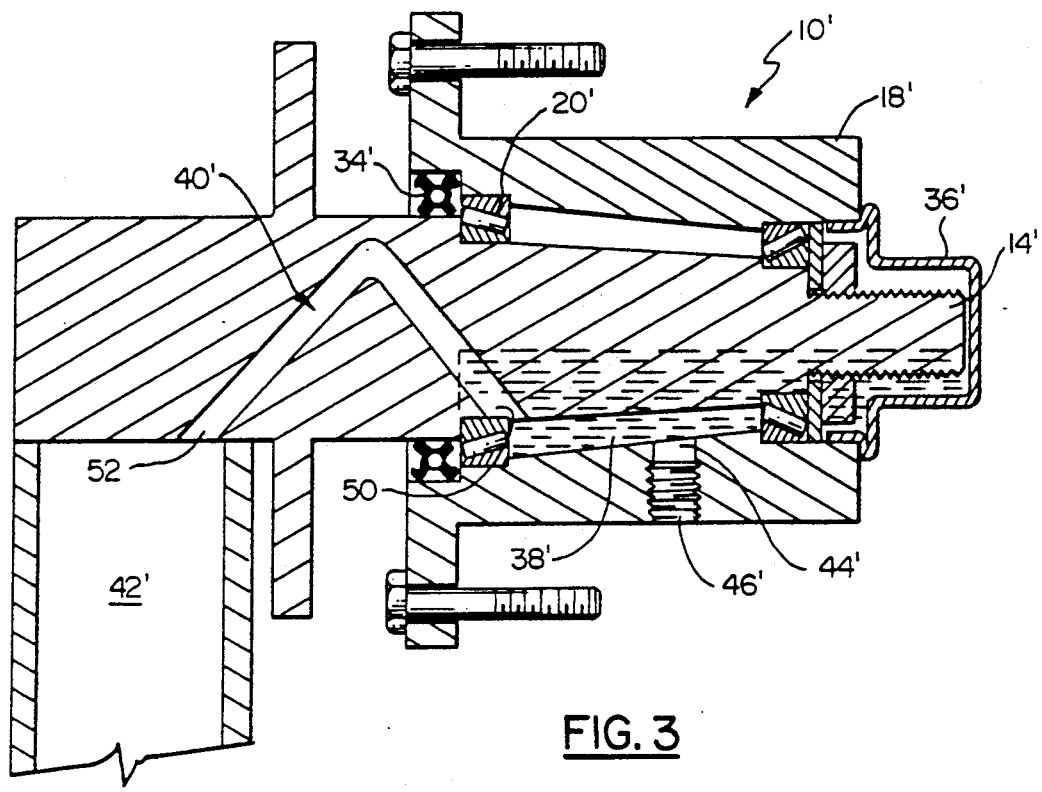
FIG. 3 is a side elevation with portions cut away showing a second embodiment of the present invention.

Referring now to FIG. 3, a side view of a preferred embodiment of a spindle assembly 10' is shown with portions cut away to better illustrate the invention. In this embodiment the air passageway 40' is in the shape of an inverted V. The top of the air passageway 40' is above the maximum anticipated oil level in lubricant cavity 38'. This prevents oil from escaping from lubricant cavity 38' into the atmosphere through air passageway 40'.

Hub 18' has an inspection hole 44' used to fill and determine the oil level in lubricant cavity 38'. The lubricant cavity 38' is filled with oil by positioning hole 44' at the twelve o'clock position, to a level sufficient to lubricate spindle assembly 10', approximately half the interior. Excess oil within lubricant cavity 38' is drained from the lubricant cavity through inspection hole 44' by rotating the hub 18' so that hole 44' is at the 9 o'clock or 3 o'clock positions parallel to the ground. If no oil drains from the hole 44', the procedure is repeated until the desired half-full condition is achieved. An inspection plug 46' is screwed into inspection hole 44' to prevent oil leakage during operation of the spindle assembly. As best shown in FIG. 2, another manner in which oil may be added to or drained from the lubricant cavity is by means of a removable screw 36a carried by the oil seal cap 36. Upon removal of the screw 36a, preferably being of a type requiring use of an Allen or Torx wrench for removal, oil may be added through the screw hole which also functions to drain any excess oil from the lubricant cavity.

Air passageway 40' has an outboard opening 50 which opens into lubricant cavity 38' at the lower edge of spindle 14' adjacent the inner bearing 20'. Preferably, the hole 50 is partially covered by bearing 20' to restrict air flow. The level of oil in lubricant cavity 38' is such that it is sufficient to cover outboard opening 50. Covering the outboard opening 50 with oil prevents moisture and foreign particles from entering lubricant cavity through tube 40' and thus protects the internal components of spindle assembly 10' from damage by rust or abrasion.

Air passageway 40' has an inboard opening 52 which opens into air pressure chamber 42' at the lower edge of spindle 14'. Upon submersion of the spindle assembly 14' under water, to launch or retrieve a boat, the air trapped in pressure chamber 42' creates a positive pressure within the lubricant cavity 38' through air passageway 40' as the air is compressed by deeper and deeper submersion. Thus, the pressure inside lubricant cavity 38' when submerged is always higher because pressure chamber 42' enters the water first before water surrounds the hub assembly. External water pressure exerted on spindle and hub assembly 18' is thereby prevented from forcing water into lubricant cavity 38'. The positive pressure in cavity 38' prevents water and foreign particles from being sucked into spindle assembly 10' through oil seal 34 or dust cap 36'.

Figure 4:
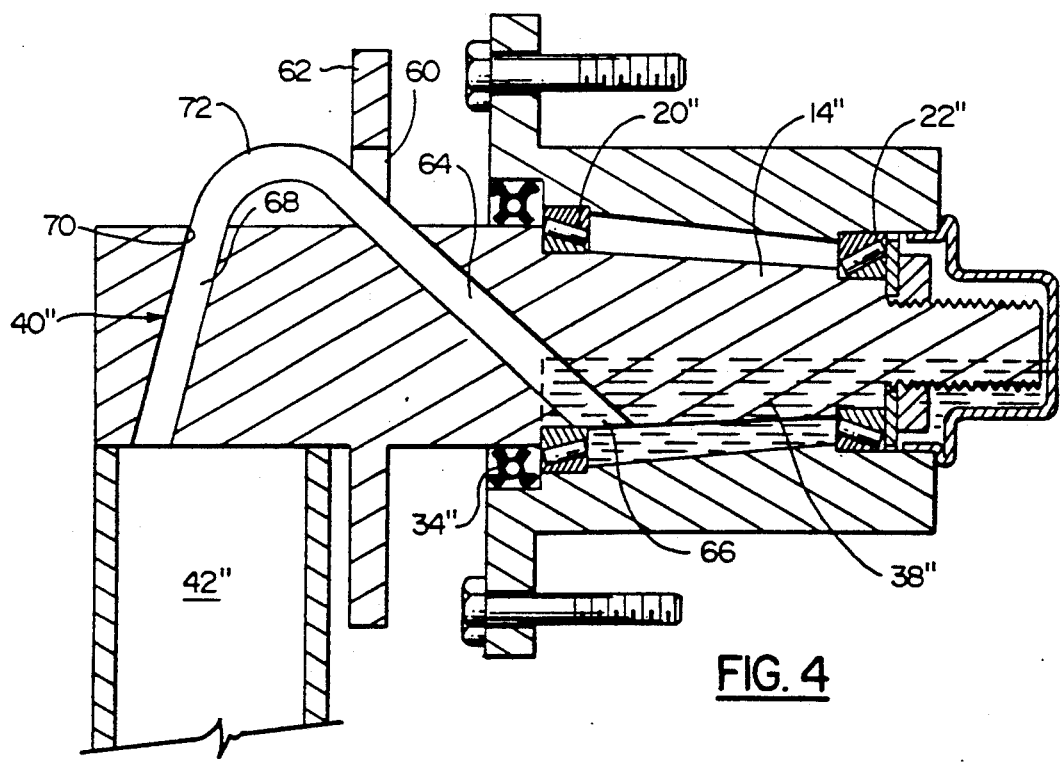
FIG. 4 is a side elevation with portions cut away showing a further embodiment of the invention.

Referring now to FIG. 4, there is shown a side view of an oil-bath spindle assembly with portions cut away to better illustrate a third embodiment of the invention. In this embodiment, a tube opening 60 is cut at a predetermined angle through flange 62. At the same predetermined angle, a first bore 64 is cut from the upper surface of spindle 14" until it creates outboard opening 66 in lubricant cavity 38" through the lower surface of spindle 14" such that outboard opening 66 lies between the inner bearing 20" and the outer bearing 22". As in the embodiment shown in FIG. 3, the oil is filled to a predetermined depth such that it covers outboard opening 66 so that moisture and foreign objects are prevented from entering lubricant cavity 38" when spindle assembly 14" is at rest or in storage. A second bore 68 is cut from a determined position within pressure chamber 42" through spindle 14" leaving an upper opening 70 at the upper surface of the outboard end of spindle 14" at a determined position behind flange 60. A flexible tube 72 is inserted to a predetermined depth through upper opening 70 into second bore 68, then through tube opening 60 in the brake flange 62, and then inserted into the opening of first bore 64 in the upper surface of spindle 14" to a predetermined depth. The second bore 68, tube 72, and first bore 64 constitute air passageway 40" in this embodiment.

As in the embodiments illustrated in FIGS. 2 and 3, passageway 40" provides air communication from chamber 42" to oil cavity 38". Air pressure in chamber 38" will increase to cause the interior pressure on seal 34" to exceed the exterior water pressure so that leakage of unwanted contaminants into cavity 38 will be eliminated. In most usual applications of the hub and wheel assembly, the interior pressure will exceed the exterior by approximately 0.25 psi.

While the invention has been described in the specification and illustrated in the drawings with reference to preferred embodiments, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the claims.

What is claimed is:

1. A hub and spindle assembly for a boat trailer that is periodically submerged in water including:
   a spindle for rotatably supporting a hub about the spindle axis;
   bearing means coaxially mounted upon said spindle for receiving a hub and wheel;
   a hub mounted upon said bearing means coaxially about said spindle for rotating upon said bearings;
   an oil-receiving cavity formed between an outer surface of said spindle and an interior surface of said hub;
   seal means for containing oil within said cavity;
   pressure chamber means defining a predetermined quantity of air for creating a positive air pressure upon submersion of the hub spindle assembly under water; and
   air passage means in communication between said pressure chamber means and said oil-receiving cavity for communicating said positive air pressure from said pressure chamber means to said oil-receiving cavity upon submersion of the hub and spindle assembly under water.

2. The hub and spindle assembly of claim 1 wherein said hub includes an access port means for inspecting the oil level in said cavity and for adding oil to said oil-receiving cavity.

3. The hub and spindle assembly of claim 1 wherein said air passage means is formed within said spindle.

4. The hub and spindle assembly of claim 1 wherein said air passage means is formed by two intersecting bores in the shape of an inverted V.

5. The hub and spindle assembly of claim 1 wherein said air passage means includes two openings, a first opening positioned at said pressure chamber means and a second opening positioned at said oil-receiving cavity between said inner bearing means and said outer bearing means.

6. A waterproof hub and spindle assembly for use on boat trailers and the like comprising
   a fixed spindle member;
   a hub member rotatably mounted thereon;
   at least one bearing member operatively positioned between said hub and spindle member;
   a sealed lubricating cavity formed between said hub and spindle member in communication with said bearing member and having a quantity of lubricating medium therein; and
   air chamber means communicating at one end with said lubricating cavity and open at another end such that when said air chamber means is submerged in water air in said air chamber means is compressed to pressurize said lubricating cavity.

7. A hub and spindle assembly as defined in claim 6 wherein said air chamber means is of a size sufficient to contain a quantity of air to prevent water from entering the lubricant cavity therethrough.

8. The hub and spindle assembly of claim 7 wherein said air chamber means includes
   a vertical tube having an open bottom and extending downwardly from said spindle member; and
   an inverted V-shaped passage formed in said spindle member and connected at one end to a top end of said vertical tube and extending to said lubricating cavity.

9. The hub and spindle assembly of claim 8 wherein upon said lubricating cavity containing a quantity of oil, said inverted V-shaped tube extends into the lubricating oil contained in said lubricating cavity.

10. The hub and spindle assembly of claim 8 wherein upon said lubricating cavity containing a quantity of oil, said inverted V-shaped tube extends into said lubricating oil cavity and extends above the surface of the oil contained therein.

11. The hub and spindle assembly of claim 8 wherein said air chamber means further includes an oil saturated filter member positioned in said inverted V-shaped passage.

12. The hub and spindle assembly of claim 8 wherein said inverted V-shaped passage comprises a length of flexible tubing extending from the top of said vertical tube upwardly above the upper surface of said spindle member and then downwardly to said lubricating cavity.

13. The hub and spindle assembly of claim 6 wherein said lubricating cavity is sealed at one end by a pressure fitted cap and at the other end by a rotary oil seal.

14. The hub and spindle assembly of claim 13 wherein said pressure fitted cap includes means for adding oil therethrough into said lubricating cavity.

15. A method of increasing the air pressure within a submersible wheel spindle having a sealed lubricant-receiving cavity comprising the steps of:
   communicating a source of atmospheric air to said sealed lubricant-receiving cavity, and pressurizing said source of atmospheric air communicating with said sealed lubricant-receiving cavity in response to submersion of said source of atmospheric air when the wheel spindle is submerged.

16. The method of claim 15 further including filtering said source of atmospheric air passing into and out from said sealed lubricant-receiving cavity.

17. The method of claim 15 wherein the step of pressurizing said source of atmospheric air comprises trapping a predetermined quality of air upon submersion of the wheel spindle and compressing said quantity of air as the wheel spindle is submerged so that the air pressure in the sealed lubricant-receiving cavity is increased.

18. The method of claim 17 wherein said predetermined quantity of air is defined by a hollow portion on an axle upon which the wheel spindle is mounted and said predetermined quantity of air is trapped therein upon submersion of said hollow axle portion.

* * * * *